(12) United States Patent
Noh et al.

(10) Patent No.: US 8,268,508 B2
(45) Date of Patent: Sep. 18, 2012

(54) FLUID TANK CAPABLE OF SUPPLYING A FUEL MIXTURE IRRESPECTIVE OF POSITION FOR FUEL CELL

(75) Inventors: Taegeun Noh, Seoul (KR); Goyoung Moon, Seoul (KR); Wonho Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 664 days.

(21) Appl. No.: 12/227,766

(22) PCT Filed: Apr. 12, 2007

(86) PCT No.: PCT/KR2007/001789
§ 371 (c)(1),
(2), (4) Date: Apr. 24, 2009

(87) PCT Pub. No.: WO2007/139281
PCT Pub. Date: Dec. 6, 2007

(65) Prior Publication Data
US 2009/0305094 A1    Dec. 10, 2009

(30) Foreign Application Priority Data

May 29, 2006  (KR) .................. 10-2006-0047888
May 29, 2006  (KR) .................. 10-2006-0047889

(51) Int. Cl.
*H01M 8/04* (2006.01)
*H01M 8/06* (2006.01)

(52) U.S. Cl. ........ 429/515; 429/408; 429/414; 429/512; 429/513

(58) Field of Classification Search .......... 429/515, 429/408, 414, 512, 513
See application file for complete search history.

(56) References Cited

U.S. PATENT DOCUMENTS

| | | | |
|---|---|---|---|
| 2004/0115506 A1* | 6/2004 | Miyazaki et al. | ............... 429/34 |
| 2007/0224465 A1* | 9/2007 | Noh et al. | ....................... 429/13 |

FOREIGN PATENT DOCUMENTS

| | | |
|---|---|---|
| JP | 05-121086 | 5/1993 |
| JP | 2004-206917 | 7/2004 |
| JP | 2005-158403 | 6/2005 |
| JP | 2006196412 A * | 7/2006 |

OTHER PUBLICATIONS

Ozaki et al., Machine translation of JP 2006196412 A, Jul. 2006.*

* cited by examiner

*Primary Examiner* — Basia Ridley
*Assistant Examiner* — Sean P Cullen
(74) *Attorney, Agent, or Firm* — McKenna Long & Aldridge LLP

(57) ABSTRACT

Disclosed herein are a fluid tank used as a water controller system for fuel cells, wherein the fluid tank includes a housing defining an inner space for receiving a liquid-phase component and a gas-phase component, discharging carbon dioxide and air of the gas-phase component, and supplying the liquid-phase component into a fuel cell stack, and wherein the housing is constructed in a dual structure in which a hermetically-sealed type inner case is disposed inside a hermetically-sealed type outer case such that a space defined between the hermetically-sealed type cases is filled with water, the housing is provided on the outer case and the inner case at one side surface thereof with one or more gas and liquid separation membranes, respectively, and the housing is provided on the outer case and the inner case at the other side surface thereof with one or more gas and liquid separation membranes, respectively, whereby the gas-phase component passes through the water filled in the space defined between the inner and outer cases when the gas-phase component is discharged to the outside from the inner space of the housing, and a fuel cell including the fluid tank.

15 Claims, 5 Drawing Sheets

[Fig. 1]
Related Art
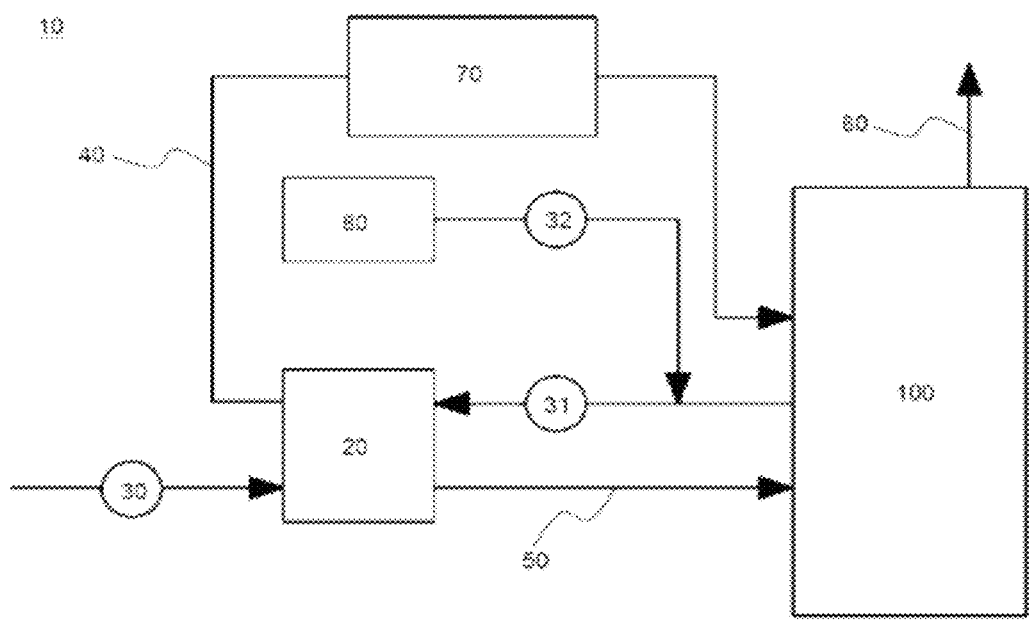
[Fig. 2]
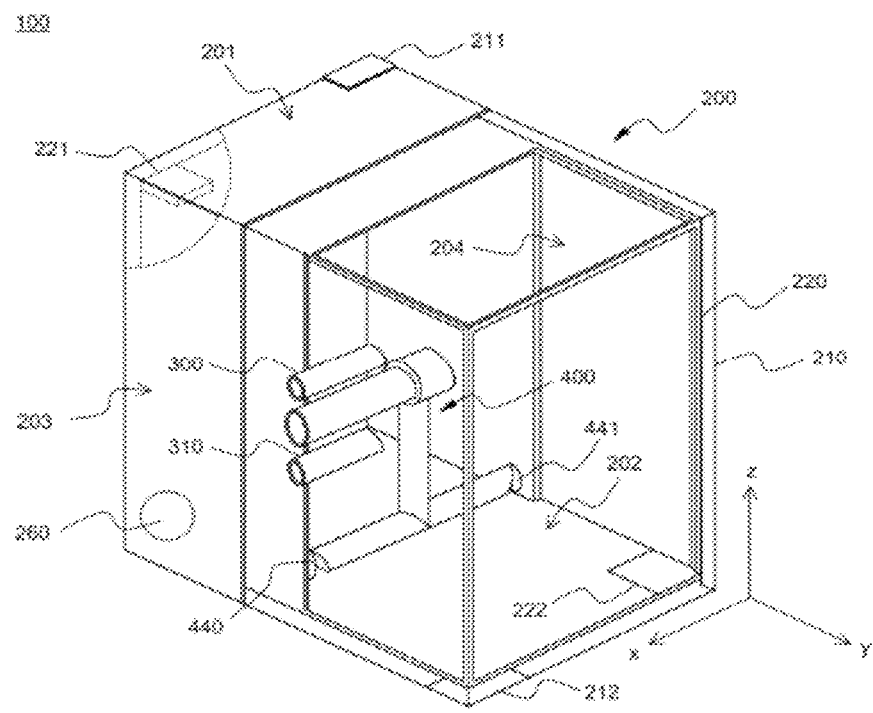

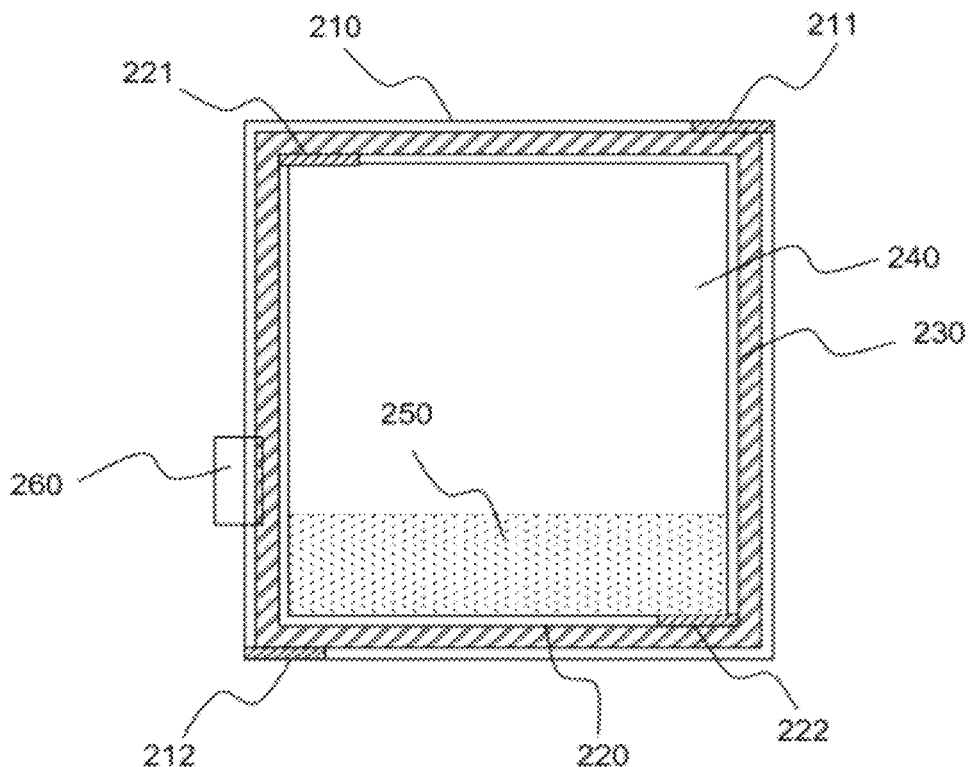
[Fig. 3]
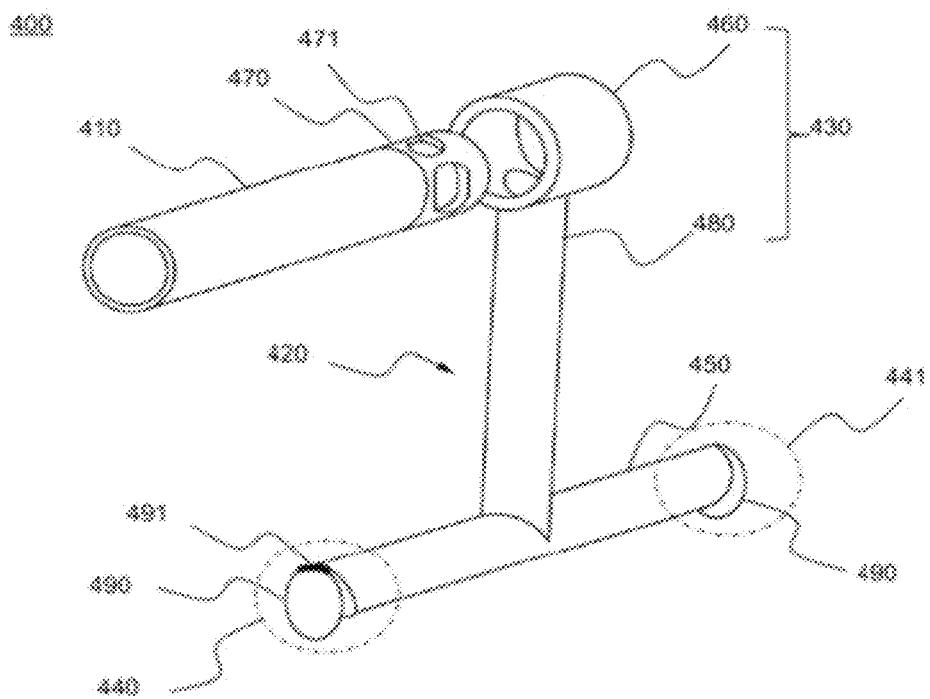
[Fig. 4]

[Fig. 5]
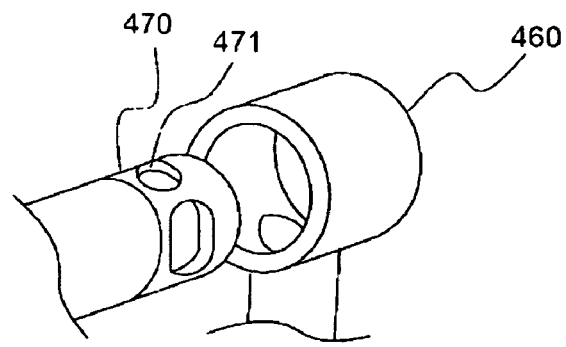
[Fig. 6]
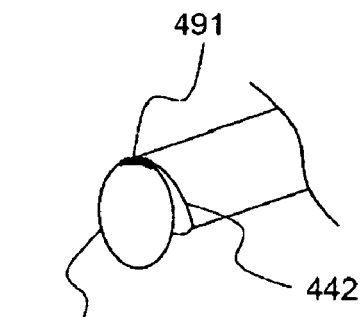
[Fig. 7]
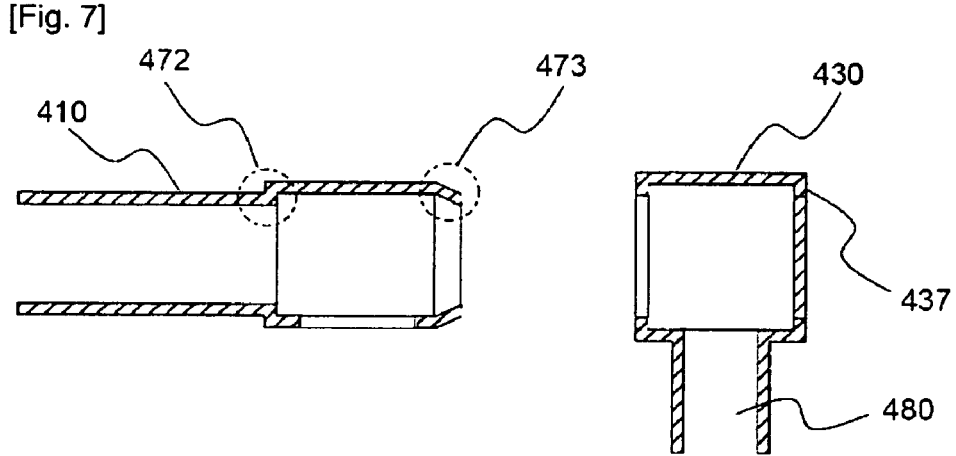

[Fig. 8]
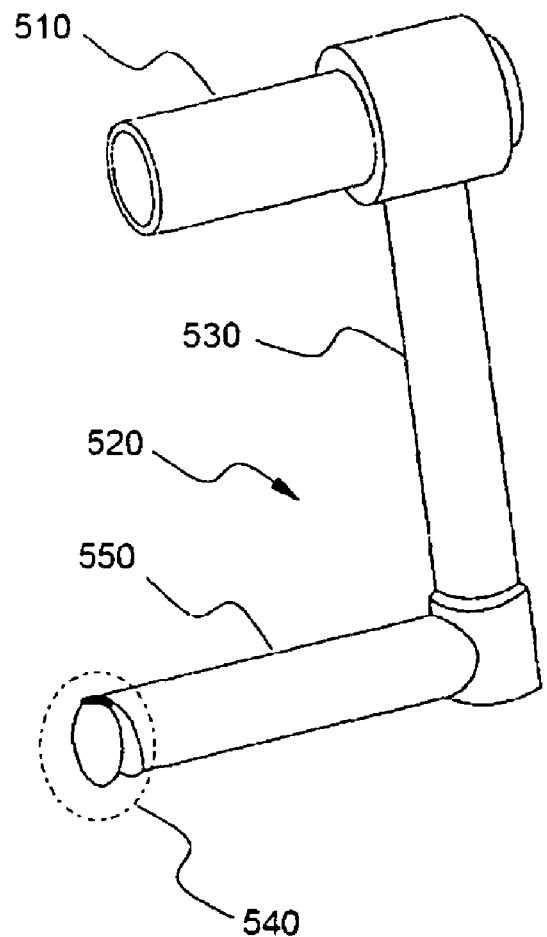
[Fig. 9]
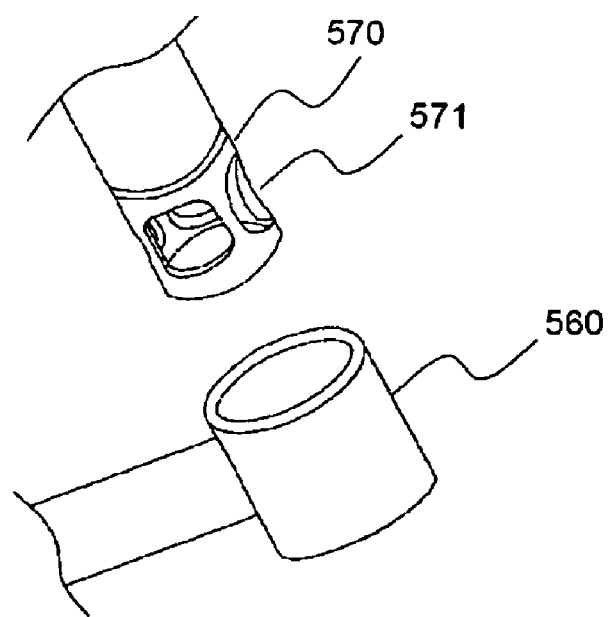

[Fig. 10]
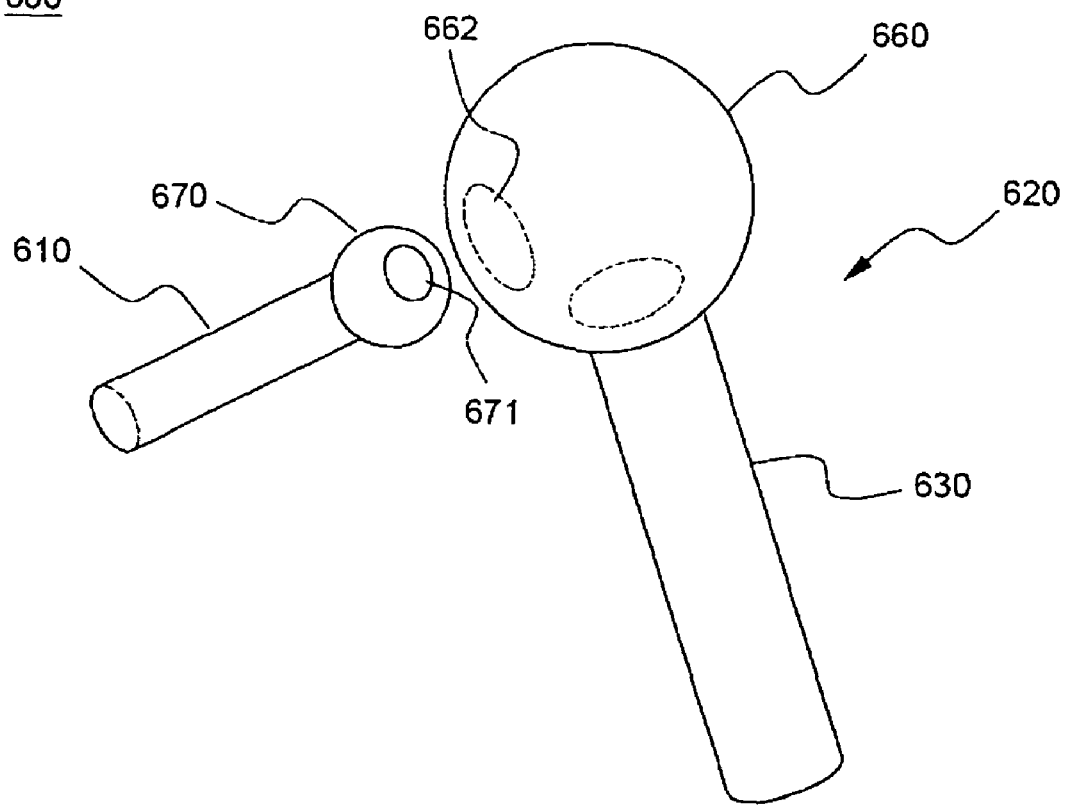
[Fig. 11]
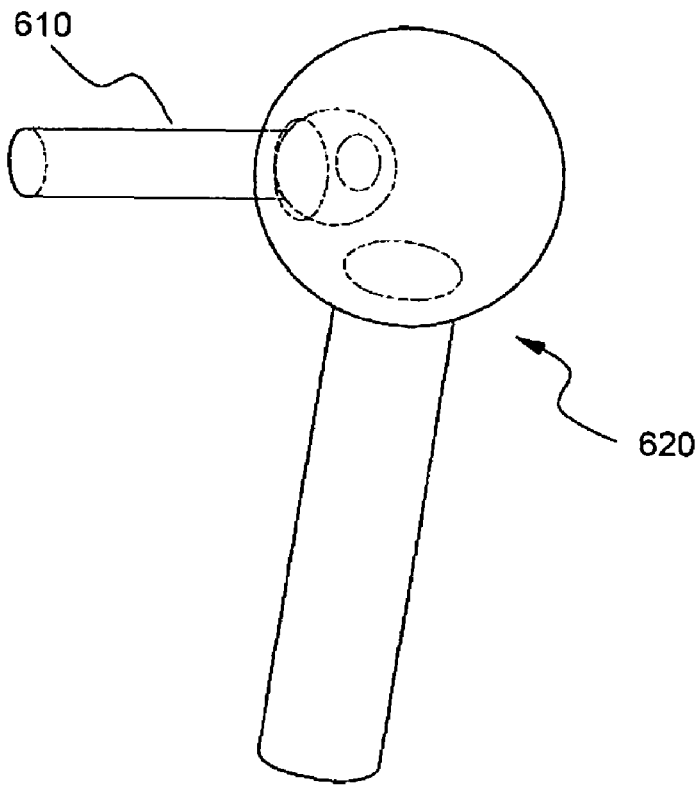

FLUID TANK CAPABLE OF SUPPLYING A FUEL MIXTURE IRRESPECTIVE OF POSITION FOR FUEL CELL

This application is a 371 national stage entry of International Application No. PCT/KR2007/001789, filed on Apr. 12, 2007 that claims priority to Korean Patent Application No. 10-2006-0047889, filed on May 29, 2006 and Korean Patent Application No. 10-2006-0047888, filed on May 29, 2006, all of which are hereby incorporated by reference in their entirety.

TECHNICAL FIELD

The present invention relates to a fluid tank for fuel cells, and, more particularly, to a fluid tank used as a water controller system for fuel cells, wherein the fluid tank includes a housing, which is constructed in a dual structure to discharge carbon dioxide and air of a liquid-phase component introduced into the housing and supply a gas-phase component introduced into the housing to a fuel cell stack, the housing having gas and liquid separation membranes, preferably, a fluid tank constructed in a structure in which an injection pipe for supplying fuel to the fuel cell stack includes a stationary pipe and a rotary pipe coupled to the stationary pipe, and a fuel cell including the same.

BACKGROUND ART

A fuel cell is a novel electric power production system that directly converts chemical energy generated by the electrochemical reaction between fuel (hydrogen or methanol) and an oxidizing agent (oxygen or air) into electrical energy. The fuel cell has attracted considerable attention as a next-generation energy source by virtue of the high energy efficiency and the low contaminant discharge, i.e., the environmentally friendly characteristics, and much research on the fuel cell has been carried out.

Based on the kinds of electrolytes used, fuel cells are classified into a phosphoric acid fuel cell, an alkaline fuel cell, a polymer electrolyte fuel cell, a molten carbonate fuel cell, and a solid oxide fuel cell. Among them, the polymer electrolyte fuel cell is classified as a proton exchange membrane fuel cell using hydrogen gas as fuel or a direct methanol fuel cell in which liquid-phase methanol, as direct fuel, is supplied to an anode.

The polymer electrolyte fuel cell is in the spotlight as a portable power supply unit, a power supply unit for vehicles, or a power supply unit for home use by virtue of low operating temperature of 100° C. or less, elimination of leakage problems due to the use of a solid electrolyte, rapid starting and response characteristics, and excellent durability. Especially, the direct methanol fuel cell has a simple fuel supply system, and the overall structure of the direct methanol fuel cell is not complicated as compared to other fuel cells. Furthermore, the miniaturization of the direct methanol fuel cell is possible. Consequently, research on the direct methanol fuel cell as a portable fuel cell is in progress.

FIG. 1 is a view typically illustrating a general direct methanol fuel cell system.

Referring to FIG. 1, the fuel cell system 10 includes: a fuel cell stack 20 having an air electrode (cathode) and a fuel electrode (anode) disposed at opposite sides of an electrolyte membrane made of a polymer material; a first pump 30 for supplying air, including oxygen, as fuel, to the cathode; a second pump 31 for supplying a methanol solution, as fuel, to the anode; a fluid tank 100 constructed such that water, carbon dioxide, and unreacted methanol generated from the fuel cell attack 20 are introduced into the fluid tank 100 through pipes 40 and 50, the carbon dioxide is discharged out of the fluid tank 100 through an outlet pipe 60, and the water and the unreacted methanol are supplied again to the fuel cell stack 20 by the second pump 31; a third pump 32 for supplying new methanol to the fuel cell stack 20 to replenish the fuel cell stack 20 with methanol having an amount corresponding to the amount of the consumed methanol; a heat exchanger 70; and a methanol tank 80.

The methanol solution supplied to the anode is separated into hydrogen ions and electrons. The hydrogen ions move to the cathode through the electrolyte membrane, and the electrons move to the cathode via an external circuit (not shown), whereby electric power is produced from the fuel cell stack 20. At this time, water is generated from the cathode, and carbon dioxide and unreacted methanol are generated from the anode. The water, the carbon dioxide, and the unreacted methanol are introduced into the fluid tank 100. Among them, the water and the unreacted methanol are mixed with pure methanol, which is supplied from the methanol tank 80 through the third pump 32 so as to replenish the fuel cell stack 20 with methanol having an amount corresponding to the amount of the consumed methanol, and the mixture is resupplied to the fuel cell stack 20.

As described above, the direct methanol fuel cell system 10 is normally operated only when a methanol solution is continuously supplied to the direct methanol fuel cell system from the outside, and carbon dioxide is continuously removed from the direct methanol fuel cell system, which is unlike chemical cells. For this reason, the function of the fluid tank, which continuously supplies the methanol solution to the direct methanol fuel cell system and continuously removes the carbon dioxide from the direct methanol fuel cell system, is very important.

Generally, the positions of pipes, through which reaction products are introduced to the fluid tank from the fuel cell stack, a pipe, through which a liquid-phase mixed solution is supplied to the fuel cell stack from the fluid tank, and a pipe, through which a gaseous carbon dioxide is discharged from the fluid tank, are fixed in the fluid tank. As a result, when the fluid tank is inclined, shaken, or turned upside down, the fuels may not be smoothly supplied to the fuel cell stack from the fluid tank, and the carbon dioxide may not be discharged from the fluid tank.

On the other hand, most of the unreacted methanol introduced into the fluid tank exists in a liquid phase. However, the unreacted methanol may be evaporated with the result that the unreacted methanol may exist in a gaseous phase. There is a great possibility that the gaseous unreacted methanol may be discharged together with the carbon dioxide. For this reason, it is very important to prevent the discharge of the unreacted methanol out of the fluid tank through appropriate collection of the unreacted methanol.

Consequently, there is high necessity for a fluid tank that is capable of effectively collecting an unreacted methanol solution discharged from a fuel cell and discharging carbon dioxide and supplying a fuel mixture to a fuel cell stack even when the fluid tank is inclined or turned upside down.

DISCLOSURE OF INVENTION

Technical Problem

Therefore, the present invention has been made to solve the above-mentioned problems, and other technical problems that have yet to be resolved.

Specifically, it is an object of the present invention to provide a fluid tank that is capable of restraining an unreacted methanol gas discharged from a fuel cell from being exhausted to the outside, effectively reusing a methanol solution obtained from the collected methanol gas, and normally discharging carbon dioxide even when the fluid tank is inclined or turned upside down.

It is another object of the present invention to provide a fuel cell including the fluid tank.

Technical Solution

In accordance with one aspect of the present invention, the above and other objects can be accomplished by the provision of a fluid tank used as a water controller system for fuel cells, wherein the fluid tank includes a housing defining an inner space for receiving a liquid-phase component and a gas-phase component, discharging carbon dioxide and air of the gas-phase component, and supplying the liquid-phase component into a fuel cell stack, and wherein the housing is constructed in a dual structure in which a hermetically-sealed type inner case is disposed inside a hermetically-sealed type outer case such that a space defined between the hermetically-sealed type cases is filled with water, the housing is provided on the outer case and the inner case at one side surface thereof with one or more gas and liquid separation membranes, respectively, and the housing is provided on the outer case and the inner case at the other side surface thereof with one or more gas and liquid separation membranes, respectively, whereby the gas-phase component passes through the water filled in the space defined between the inner and outer cases when the gas-phase component is discharged to the outside from the inner space of the housing.

Consequently, the fluid tank according to the present invention can maximally reduce the amount of the discharged methanol vapor. Specifically, the gas-phase component introduced into the fluid tank cannot be discharged to the outside before the gas-phase component passes through the water filled in the space defined between the inner and outer cases. Consequently, unreacted methanol vapor existing in the gas-phase component is absorbed into the water filled in the space defined between the inner and outer cases, and therefore, the unreacted methanol vapor is prevented from being discharged to the outside.

In consideration of the above-mentioned respect, it is preferable to form the gas and liquid separation membranes on the inner and outer cases such that the gas and liquid separation membranes are spaced apart from each other. When one gas and liquid separation membrane is formed at the left side of the upper end surface of the inner case, for example, another gas and liquid separation membrane may be formed at the right side of the upper end surface of the outer case. Consequently, the length of a flow channel, through which the gas-phase component passing through the gas and liquid separation membrane formed on the inner case flows to the gas and liquid separation membrane formed on the outer case, is increased, and therefore, the amount of unreacted methanol vapor absorbed into the water filled in the space defined between the inner and outer cases is further increased.

Also, the gas and liquid separation membranes are formed at one side surface of the housing and the other side surface of the housing opposite to the one side surface of the housing. Consequently, even when the fluid tank is not maintained uprightly due to various external factors, the gas-phase component, such as the carbon dioxide and the air, is normally discharged out of the fluid tank.

Preferably, the gas and liquid separation membranes are formed on a surface perpendicular to one side surface of the housing at which a cathode-side introduction pipe and an anode-side introduction pipe are disposed. When the introduction pipes are disposed at the one side surface of the housing, for example, the gas and liquid separation membranes may be formed on a surface perpendicular to the one side surface of the housing, i.e., the top surface and/or the bottom surface of the housing. The gas and liquid separation membranes serve as a unique channel, through which the gas-phase component introduced into the fluid tank is discharged to the outside. Consequently, it is further preferable to form the gas and liquid separation membranes at the diagonal corners of the opposite surfaces of the housing such that, even when the fluid tank is inclined at an arbitrary angle, at least one of the gas and liquid separation membranes formed at the inner housing is in continuous contact with the gas-phase component in the fluid tank. This structure will be described below in detail with reference to the accompanying drawings illustrating preferred embodiments of the present invention.

The cathode-side introduction pipe and the anode-side introduction pipe are pipes through which reaction products generated in the fuel cell stack are introduced into the fluid tank. The cathode-side introduction pipe is a pipe connected to a cathode of the fuel cell stack, and the anode-side introduction pipe is a pipe connected to an anode of the fuel cell stack.

As described above, the methanol vapor introduced into the space defined between the inner and outer cases is absorbed into the water filed in the space defined between the inner and outer cases. As a result, the concentration of the methanol is slightly increased. Consequently, it is preferable to form an opening and closing hole for circulating or exchanging the water filled in the space defined between the inner and outer cases at the inner case and/or the outer case of the housing. For example, the opening and closing hole may be connected to the cathode-side introduction pipe or the anode-side introduction pipe through an additional pipe so as to reuse the methanol dissolved in the water.

In a preferred embodiment, the fluid tank further comprises a pipe (an injection pipe) for supplying the liquid-phase component to the fuel cell stack, and the injection pipe comprises a stationary pipe penetrating through the housing and a rotary pipe coupled to an inner end of the stationary pipe. The rotary pipe is rotatably coupled to the stationary pipe such that an inlet port of the rotary pipe is directed to the lowermost part of the fluid tank due to the gravity when the fluid tank is displaced. With this structure, the liquid-phase component introduced into the fluid tank can be resupplied to the fuel cell stack via the rotary pipe and the stationary pipe through the inlet port even when the fluid tank is inclined at an arbitrary angle.

The structure of the stationary pipe and the rotary pipe may be variously modified based on the above-described structure so long as the inlet port of the rotary pipe is directed to the lowermost part of the fluid tank at any circumstances. Other possible structures of the stationary pipe and the rotary pipe will be described below in detail.

As a first example, the rotary pipe may comprise a connection member rotatably coupled to the stationary pipe such that the connection member is perpendicular to the stationary pipe and an introduction member perpendicularly connected to the connection member such that the introduction member communicates with the connection member, the introduction member having inlet ports formed at ends thereof.

In this structure, the connection member may comprise a cylindrical end coupled to the coupling end of the stationary pipe and a pipe-shaped part perpendicularly connected to the cylindrical end such that the connection member can be rotated 360 degrees about the stationary pipe while the connection member is coupled to the stationary pipe. The stationary pipe is coupled to the connection member in such a manner that the stationary pipe is inserted into the cylindrical end of the connection member. Preferably, the stationary pipe is provided at the coupling end thereof with a plurality of through-holes, which are arranged along the circumference of the coupling end, such that the liquid-phase component can move through the through-holes.

Also, the introduction member may be a cylindrical member parallel with the stationary pipe such that the connection member is connected to the introduction member at the middle of the introduction member, and the introduction member may be provided at opposite ends thereof with inlet ports. According to circumstances, the inlet ports of the introduction member may be exposed to the gas-phase component in the fluid tank. Consequently, it is preferable to mount openable covers at the inlet ports of the introduction member so as to prevent the introduction of the gas-phase component through the inlet ports.

The introduction member may be rotated while drawing a circle about the stationary pipe. When the fluid tank is inclined in the direction parallel with the rotating direction of the connection member, the inlet ports formed at the opposite ends of the introduction member may be located at the lowermost part of the fluid tank by the rotation of the connection member. When the fluid tank is inclined in the direction perpendicular to the rotating direction of the connection member, on the other hand, at least one of the inlet ports formed at the opposite ends of the introduction member may be located at the lowermost part of the fluid tank due to the structure in which the introduction member extends from the end of the connection member in opposite directions.

Hinge type covers are mounted at the inlet ports of the introduction member to open the inlet ports when the inlet ports are located at the lowermost part of the fluid tank and close the inlet ports when the inlet ports are located at the uppermost part of the fluid tank. Preferably, the inlet ports are constructed in an inclined cutout structure, and the covers are hingedly connected to the inclined cutout ends of the inlet ports such that the covers can be rapidly opened and closed according to circumstances.

As a second example, the rotary pipe may comprise a connection member rotatably coupled to the stationary pipe such that the connection member is perpendicular to the stationary pipe and an introduction member rotatably coupled to the connection member such that the introduction member is perpendicular to the connection member, the introduction member being provided at one end thereof with an inlet port.

In this structure, the connection member and the introduction member may have a cylindrical end such that the connection member and the introduction member can be rotated while the connection member and the introduction member are coupled to the stationary pipe and the connection member, respectively. The stationary pipe, which is coupled to the connection member such that the stationary pipe is inserted into the connection member, and may be provided at the coupling end thereof with a plurality of through-holes, which are arranged along the circumference of the coupling end of the stationary pipe, and the connection member, which is coupled to the introduction member such that the connection member is inserted into the introduction member, may be provided at the coupling end thereof with a plurality of through-holes, which are arranged along the circumference of the coupling end of the connection member. Preferably, the inlet port provided at the one end of the introduction member is constructed in an inclined cutout structure, and the cover is hingedly connected to the inclined cutout end of the inlet port. This structure was already described in connection with the first example.

When the fluid tank is inclined in the direction parallel with the rotating direction of the introduction member, the inlet port of the introduction member may be located at the lowermost part of the fluid tank by the rotation of the connection member. When the fluid tank is inclined in the direction perpendicular to the rotating direction of the introduction member, on the other hand, the inlet port of the introduction member may be located at the lowermost part of the fluid tank by the rotation of the connection member.

As a third example, the coupling end of the stationary pipe may be constructed in a protruding structure having a relatively large diameter, and the end of the rotary pipe corresponding to the coupling end of the stationary pipe may be constructed in a structure in which the protruding coupling end of the stationary pipe can be rotated while the protruding coupling end of the stationary pipe is forcibly inserted in the corresponding end of the rotary pipe.

Specifically, the end of the rotary pipe may be formed in a spherical shape having a relatively large diameter, and the spherical end of the rotary pipe may be provided with a space constructed in a structure corresponding to the coupling end of the stationary pipe such that the coupling end of the stationary pipe can be inserted into the space of the spherical end of the rotary pipe. In this case, the stationary pipe or the coupling end of the stationary pipe is preferably made of an elastic material to minimize the damage to the stationary pipe or the coupling end of the stationary pipe when the coupling end of the stationary pipe is forcibly inserted into the coupling end of the stationary pipe.

In accordance with another aspect of the present invention, there is provided a fuel cell including the above-described fluid tank. Preferably, the fuel cell is a direct methanol fuel cell.

The detailed structure and a method of manufacturing the direct methanol fuel cell are well known in the art to which the present invention pertains, and therefore, the description of the direct methanol fuel cell will not be given. On the other hand, the construction and the operating principle of the fuel cell system were previously described in brief with reference to FIG. 1.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a view illustrating the structure of a general direct methanol fuel cell system;

FIG. 2 is a typical view illustrating a fluid tank according to a first preferred embodiment of the present invention;

FIG. 3 is a front see-through view of the fluid tank of FIG. 2;

FIG. 4 is an exploded perspective view, in part, illustrating an injection pipe located in the fluid tank of FIG. 2;

FIG. 5 is an enlarged view, in part, illustrating the coupling between a stationary pipe and a rotary pipe of the injection pipe of FIG. 4;

FIG. 6 is an enlarged view, in part, illustrating the inlet port of an introduction member of the injection pipe of FIG. 4;

FIG. 7 is a vertical sectional view illustrating the coupling between the stationary pipe and the rotary pipe of the injection pipe of FIG. 4;

FIG. 8 is an assembled perspective view, in part, illustrating an injection pipe located in a fluid tank according to a second preferred embodiment of the present invention;

FIG. 9 is an enlarged view, in part, illustrating the coupling between a connection member and an introduction member of the injection pipe of FIG. 8;

FIG. 10 is an exploded perspective view, in part, illustrating an injection pipe located in a fluid tank according to a third preferred embodiment of the present invention; and FIG. 11 is a typical view illustrating the coupling between a stationary pipe and a rotary pipe of the injection pipe of FIG. 10.

MODE FOR THE INVENTION

Now, a preferred embodiment of the present invention will be described in detail with reference to the accompanying drawings. It should be noted, however, that the scope of the present invention is not limited by the illustrated embodiment.

FIG. 2 is a typical view illustrating a fluid tank according to a first preferred embodiment of the present invention. In FIG. 2, the surfaces of cases are partially drawn so as to more easily illustrate the interior structure of the fluid tank.

Referring to FIG. 2, the fluid tank 100 includes: a housing 200 including a hexahedral outer case 210 and a hexahedral inner case 220; a cathode-side introduction pipe 300 and an anode-side introduction pipe 310 mounted to one side surface 203 of the housing 200 such that the cathode-side introduction pipe 300 and the anode-side introduction pipe 310 penetrate through the housing 200, the cathode-side introduction pipe 300 and the anode-side introduction pipe 310 being connected to a cathode and an anode of a fuel cell stack (not shown), respectively; and an injection pipe 400 constructed in a structure to resupply only a methanol solution to the fuel cell stack. Among reaction products introduced into the fluid tank 100 from the fuel cell stack through the cathode-side introduction pipe 300 and the anode-side introduction pipe 310, carbon dioxide is discharged out of the fluid tank 100, and an unreacted methanol solution is diluted to a predetermined concentration and is resupplied to the fuel cell stack through the injection pipe 400.

The housing 200 is constructed in a dual structure in which the outer case 210 and the inner case 220 are spaced a predetermined distance from each other. The space defined between the cases 210 and 220 is filled with water 230 (see FIG. 3). Also, gas and liquid separation membranes (outer separation membranes A and B) 211 and 212 are formed at the outer case 210 on the top surface 201 and the bottom surface 202 of the housing 200, respectively, and gas and liquid separation membranes (inner separation membranes A and B) 221 and 222 are formed at the outer case 220 on the top surface 201 and the bottom surface 202 of the housing 200, respectively. And an opening and closing hole 260 is formed for circulating or exchanging the water filled in the space defined between the inner and outer cases at the outer case 210 of the housing 200. This structure is shown in detail in FIG. 3, which is a front see-through view (the y direction) of the fluid tank.

Referring to FIG. 3, the outer separation membrane A 211 and the inner separation membrane A 221 are disposed at corresponding corners of the outer and inner cases 210 and 220 at the top surface 201 (see FIG. 2) of the housing 200, respectively, such that the outer separation membrane A 211 and the inner separation membrane A 221 are maximally spaced from each other. This is to increase the length of a flow channel, through which methanol vapor passing through the inner separation membrane A 221 flows to the outer separation membrane A 211, thereby increasing the amount of methanol absorbed into the water 230. In the same manner, the outer separation membrane A 211 and the inner separation membrane B 222, the outer separation membrane B 212 and the inner separation membrane B 222, and the outer separation membrane B 212 and the inner separation membrane A 221 are maximally spaced from each other, respectively.

While the fluid tank 100 (see FIG. 2) is in position, the inner separation membrane A 221 is in contact with a gas-phase component 240, such as carbon dioxide, a methanol gas, and air, and the inner separation membrane B 222 is in contact with a liquid-phase component 250, such as a methanol solution and water. When the fluid tank 100 is inclined in the x direction of FIG. 2, on the other hand, the liquid-phase component 250 moves to the one side surface 203 of the housing 200 with the result that the inner separation membrane A 221 is brought into contact with the liquid-phase component 250. At the same time, however, the inner separation membrane B 222 is exposed to the gas-phase component 240. Consequently, it is possible to discharge the carbon dioxide without difficulty. Since the inner separation membranes 221 and 222 are disposed at the corners of the housing 200, the carbon dioxide is discharged without difficulty even when the fluid tank 100 is inclined in the x, y, and z directions, and in the directions opposite to the x, y, and z direction, i.e., in all directions. In other words, even when the fluid tank 100 is inclined in any direction, at least one of the inner separation membranes 221 and 222 is exposed to the gas-phase component 240, and therefore, it is possible to discharge the carbon dioxide without difficulty.

Referring to FIGS. 2 and 4 to 6, the injection pipe 400 of the fluid tank 100 includes a stationary pipe 410 penetrating through the one side surface 203 of the housing 200 and a rotary pipe 420 perpendicularly coupled to the stationary pipe 410. The rotary pipe 420 includes a connection member 430 directly connected to the stationary pipe 410 and an introduction member 450 having inlet ports 440 and 441, through which a methanol solution is introduced.

Referring to FIGS. 4 and 5, which are exploded perspective views of injection pipe 400, the injection pipe 400 is assembled in a structure in which the stationary pipe 410 is inserted into the rotary pipe 420; specifically, a coupling end 470 of the stationary pipe 410 is inserted into a cylindrical end 460 of the connection member 430 of the rotary pipe 420. The stationary pipe 410 must be rotated while the stationary pipe 410 is inserted in the connection member 430 of the rotary pipe 420. Consequently, as shown in FIG. 7, the stationary pipe 410 includes a protruding part 472 and a taper part 473, and the connection member 430 includes a step part 437 corresponding to the protruding part 472 and the taper part 473 of the stationary pipe 410. The step part 437 of the connection member 430 is formed such that the step part 437 extends inward. Also, the coupling end 470 is provided with a plurality of through-holes 471, through which the coupling end 470 communicates with a pipe-shaped part 480 of the connection member 430.

Referring to FIGS. 4 and 6, the inlet ports 440 and 441 are disposed at the opposite ends of the introduction member 450, respectively. To the inlet ports 440 and 441 are attached openable covers 490, respectively, for preventing the gas-phase component from being introduced through the inlet ports 440 and 441. Referring to FIG. 2 together, for example, when the fluid tank 100 is inclined in the x direction, the inlet port 440 disposed adjacent to the one side surface 203 is located in the methanol solution, whereas the inlet port 441 at the other side is exposed to the gas-phase component. At this time, the inlet port 441 is closed by the cover 490 with the result that the introduction of the gas-phase component through the inlet port 441 is prevented. Also, the inlet ports 440 and 441 are constructed in an inclined cutout structure 442 in which the inlet ports 440 and 441 are tapered downward so as to prevent the inlet ports 440 and 441 from being completely closed by the corresponding covers 490 when both the inlet ports 440 and 441 are located in the methanol solution. In addition, the covers 490 are attached to the inlet ports 440 and 441 in a hinge-type structure 491 such that the inlet ports 440 and 441 can be easily opened and closed.

Referring to FIGS. 2 and 4, when the fluid tank 100 is inclined in the y direction, the rotary pipe 420, specifically, the connection member 430 is rotated about the stationary pipe 410 in the y direction with the result that the inlet ports 440 and 441 of the introduction member 450 are continuously located in the methanol solution.

The inlet ports 440 and 441 are continuously directed to the one side surface 203 of the housing 200 and the other side surface 204 of the housing 200 due to the structure of the introduction member 450. Consequently, even when the fluid tank 100 is inclined in the direction in which the rotary pipe 420 cannot be rotated, i.e., in the x direction, the inlet port 440 is continuously directed to the one side surface 203 of the housing 200, and therefore, the inlet port 440 is located in the methanol solution.

FIG. 8 is an assembled perspective view, in part, illustrating an injection pipe located in a fluid tank according to a second preferred embodiment of the present invention, and FIG. 9 is an enlarged view, in part, typically illustrating the coupling between a connection member and an introduction member of the injection pipe of FIG. 8.

Referring to these drawings, the injection pipe 500 is constructed in a structure similar to that of the injection pipe 400 shown in FIG. 4. Specifically, a connection member 530 and an introduction pipe 550 of a rotary pipe 520 are coupled with each other in a structure in which a cylindrical end 560 of the introduction member 550 is inserted into a coupling end 570 of the connection member 530 in the same manner as the coupling between the stationary pipe 410 and the connection member 430 of the injection pipe 400.

The structure of the coupling end 570 of the connection member 530, the structure of an inlet port 540 of the introduction member 550, and the coupling between the stationary pipe 510 and the connection member 530 are the same as those of the previous embodiment of the present invention described with reference to FIG. 4, and therefore, a detailed description thereof will not be given.

FIG. 10 is an exploded perspective view, in part, illustrating an injection pipe located in a fluid tank according to a third preferred embodiment of the present invention, and FIG. 11 is a typical view illustrating the coupling between a stationary pipe and a rotary pipe of the injection pipe of FIG. 10.

Referring to these drawings, the injection pipe 600 includes a stationary pipe 610 having a protrusion-shaped coupling end 670 and a rotary pipe 620 having a hollow spherical end 660 constructed in a structure in which the coupling end 670 can be freely rotated while the coupling end 670 is inserted in the hollow spherical end 660.

The stationary pipe 610 is provided with a through-hole 671, which extends through the stationary pipe 610 in the longitudinal direction of the stationary pipe 610. The spherical end 660 of the rotary pipe 620 is constructed in a hollow structure. The spherical end 660 is made of an elastic material. The spherical end 660 is provided at one side thereof with a coupling hole 662 having an inner diameter less than the outer diameter of the coupling end 670 of the stationary pipe 610. Consequently, the coupling between the stationary pipe 610 and the rotary pipe 620 is easily accomplished by forcibly inserting the coupling end 670 into the coupling hole 662. While the stationary pipe 610 is coupled to the rotary pipe 620, the coupling end 670 of the stationary pipe 610 can be freely rotated in the coupling hole 662 of the rotary pipe 620.

Due to the weight of the rotary pipe 620, the rotary pipe 620 is continuously directed in the direction of gravity. Consequently, an inlet port 630 of the rotary pipe 620 is located in a methanol solution, and therefore, an additional openable cover is not needed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the fluid tank for fuel cells according to the present invention has the effect of effectively reusing an unreacted methanol gas discharged from a fuel cell and performing a normal operation even when the fluid tank is inclined or turned upside down.

The invention claimed is:
1. A fluid tank used as a water controller system for fuel cells,
wherein the fluid tank comprises a housing defining an inner space for receiving a liquid-phase component and a gas-phase component, discharging carbon dioxide and air of the gas-phase component, and supplying the liquid-phase component into a fuel cell stack, and
wherein the housing is constructed in a dual structure in which a hermetically-sealed type inner case is disposed inside a hermetically-sealed type outer case such that a space defined between the hermetically-sealed type cases is filled with water,
the housing is provided on the outer case at one side surface thereof, the one side surface being perpendicular to another side surface thereof at which a cathode-side introduction pipe and an anode-side introduction pipe are disposed, with one or more gas and liquid separation membranes, and the housing is provided on the inner case at one side surface thereof, the one side surface being perpendicular to another side surface thereof at which a cathode-side introduction pipe and an anode-side introduction pipe are disposed, with one or more gas and liquid separation membranes, and
the housing is provided on the outer case at an opposite side surface thereof, the opposite side surface being perpendicular to another opposite side surface thereof at which a cathode-side introduction pipe and an anode-side introduction pipe are disposed, with one or more gas and liquid separation membranes, and the housing is provided on the inner case at an opposite surface thereof, the opposite side surface being perpendicular to another opposite side surface thereof at which a cathode-side introduction pipe and an anode-side introduction pipe are disposed, with one or more gas and liquid separation membranes,
whereby the gas-phase component passes through the water filled in the space defined between the inner and outer cases when the gas-phase component is discharged to the outside from the inner space of the housing.

2. The fluid tank according to claim 1, wherein the gas and liquid separation membranes are formed on the outer case and the inner case both at the one side surface of the housing and the opposite side surface of the housing such that the gas and liquid separation membranes are spaced apart from each other.

3. The fluid tank according to claim 1, wherein the housing is provided with an opening and closing hole for circulating or exchanging the water filled in the space defined between the inner and outer cases.

4. The fluid tank according to claim 1, wherein the fluid tank further comprises an injection pipe for supplying the liquid-phase component to the fuel cell stack, and wherein the injection pipe comprises a stationary pipe penetrating through the housing and a rotary pipe coupled to an inner end of the stationary pipe, the rotary pipe being rotatably coupled to the stationary pipe such that an inlet port of the rotary pipe is directed to the lowermost part of the fluid tank due to the gravity when the fluid tank is displaced.

5. The fluid tank according to claim 4, wherein the rotary pipe comprises a connection member rotatably coupled to the stationary pipe such that the connection member is perpendicular to the stationary pipe, and an introduction member perpendicularly connected to the connection member such that the introduction member communicates with the connection member, the introduction member having inlet ports formed at ends thereof.

6. The fluid tank according to claim 5, wherein the stationary pipe is provided at a coupling end thereof with a plurality of through-holes, which are arranged along the circumference of the coupling end, and the connection member comprises a cylindrical end coupled to the coupling end of the stationary pipe and a pipe-shaped part perpendicularly connected to the cylindrical end such that the pipe-shaped part communicates with the cylindrical end.

7. The fluid tank according to claim 5, wherein the introduction member is a cylindrical member parallel with the stationary pipe such that the connection member is connected to the introduction member at the middle of the introduction member, and the introduction member is provided at opposite ends thereof with inlet ports, to which openable covers are attached, respectively.

8. The fluid tank according to claim 7, wherein the inlet ports are constructed in an inclined cutout structure, and the covers are hingedly connected to the inclined cutout ends of the inlet ports.

9. The fluid tank according to claim 4, wherein the rotary pipe comprises a connection member rotatably coupled to the stationary pipe such that the connection member is perpendicular to the stationary pipe, and an introduction member rotatably coupled to the connection member such that the introduction member is perpendicular to the connection member, the introduction member being provided at one end thereof with an inlet port.

10. The fluid tank according to claim 9, wherein the stationary pipe is provided at a coupling end thereof with a plurality of through-holes, which are arranged along the circumference of the coupling end of the stationary pipe, and the connection member is provided at the coupling end thereof with a plurality of through-holes, which are arranged along the circumference of the coupling end of the connection member, and wherein the connection member has an end corresponding to the coupling end of the stationary pipe, the end of the connection member being constructed in a cylindrical structure, and the introduction member has an end corresponding to the coupling end of the connection member, the end of the introduction member being constructed in a cylindrical structure.

11. The fluid tank according to claim 10, wherein the inlet port provided at the one end of the introduction member is constructed in an inclined cutout structure, and a cover is hingedly connected to the inclined cutout end of the inlet port.

12. The fluid tank according to claim 4, wherein the coupling end of the stationary pipe is constructed in a protruding structure having a diameter, and an end of the rotary pipe corresponding to the coupling end of the stationary pipe is constructed in a structure in which a protruding coupling end of the stationary pipe can be rotated while the protruding coupling end of the stationary pipe is forcibly inserted in the corresponding end of the rotary pipe.

13. The fluid tank according to claim 12, wherein the stationary pipe or the coupling end of the stationary pipe is made of an elastic material.

14. A fuel cell including the fluid tank according to claim 1 as a water controller system.

15. The fuel cell according to claim 14, wherein the fuel cell is a direct methanol fuel cell.

* * * * *